United States Patent Office 3,458,349
Patented July 29, 1969

3,458,349
PROCESS FOR IMPARTING WET AND DRY CREASE RESISTANCE TO TEXTILE FABRICS WITH AN N-METHYLOLATE ACRYLAMIDE TELOMER
Fujio Mashio, Kyoto, and Kiyoshi Fukui, Uji-shi, Japan, assignors to Sumitomo Chemical Company, Ltd., Osaka, Japan, a corporation of Japan
No Drawing. Filed Jan. 12, 1966, Ser. No. 520,074
Claims priority, application Japan, Jan. 16, 1965, 40/2,265
Int. Cl. D06m 3/30
U.S. Cl. 117—139.4            3 Claims

ABSTRACT OF THE DISCLOSURE

A water soluble resin composition consisting of a curing catalyst and an N-methylolated acrylamide telomer represented by the formula:

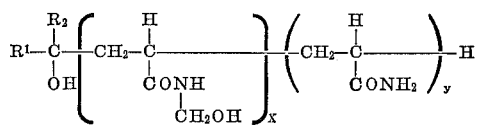

wherein $2 < x+y < 30$, $R^1$ and $R^2$ are H or alkyl ($C_{1-12}$) can impart dry and wet crease resistance and permanent hardness and repulsion with fullness to fabric comprising a natural fiber, a synthetic fiber or a mixture thereof. Said composition may be used together with an initial condensation product of other thermosetting resin, thermoplastic resin, softening agent, water-repelling agent, flameproofing agent and/or other adjuvants. Said composition is applied to the fabric by impregnating the fabric with the composition, squeezing the impregnated fabric, predrying and heating the same to cure the resin in the fabric.

---

The present invention relates to novel resin composition used for the processing of fabrics, and process for finishing textile fabrics with said resin composition.

One object of the present invention is to provide novel resin composition.

Another object is to provide a process for endowing dry and wet crease resistance and permanent hardness and repulsion with fullness to fabrics comprising fibers of natural and synthetic and mixtures thereof.

Other objects will be apparent from the following description.

In order to accomplish these objects, the present invention provides a novel resin composition which consists essentially of an aqueous solution of N-methylolated acrylamide telomer having the formula:

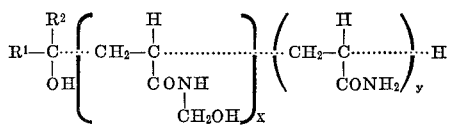

wherein $R^1$ and $R^2$ are hydrogen or alkyl having 1 to 12 carbon atoms, $x$ and $y$ are integers and $(x+y)$ is an integer of from 2 to 30, said aqueous solution containing a curing agent; a novel resin composition, which consists essentially of an aqueous solution of said N-methylolated acrylamide telomer and precondensation product of other thermosetting resin, thermoplastic resin and the like, said aqueous solution containing a curing agent; and a process for endowing dry and wet crease resistance and permanent hardness and repulsion with fullness to fabrics comprising fibers of natural and synthetic and mixtures thereof, which comprises dipping said fabric into a resin bath having said composition, squeezing said fabric, predrying the impregnated fabric and heating the dried fabric to cure the impregnated resin.

The methylolation proportion, that is $$\frac{x}{x+y}$$

is from 0.1 to 1.0, preferably 0.5 to 1.0.

Examples of the alcohol moiety include methanol, ethanol, n-propanol, isopropanol, n-butanol, isobutanol, n-octanol, isooctanol and n-dodecanol, among which isopropanol and isobutanol are preferable.

The acrylamide telomer is water-soluble white powder having the softening point of 170°–200° C. The telomer of the invention may be prepared by the following procedure. Acrylamide is dissolved in one of the above mentioned alcohols having at least one hydrogen atom on the carbon atom adjacent to the alcoholic hydroxyl group, and a radical initiator, such as a peroxide, is then added to the resulting solution. The resulting mixture is heated to effect reaction to obtain an acrylamide telomer according to the following reaction equation:

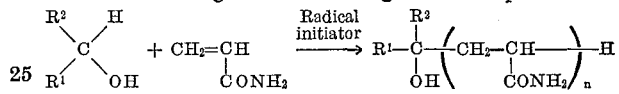

The reaction is caused according to a so-called telomerization. That is, the radical initiator is pyrolized to produce a radical and the resulting radical draws a hydrogen atom out of the alcohol to form an alcohol radical. The thus formed alcohol radical adds to the double bond of the acrylamide to form an alcohol-added acrylamide. This radical adds other acrylamide molecules, whereby the chain of the radical grows. The thus grown radical causes chain transfer to another of the excess free alcohol molecules to form an acrylamide telomer. Said acrylamide telomer is reacted with formaldehyde in aqueous solution to produce an N-methylolated acrylamide telomer. This process is described in copending application Ser. No. 519,424, filed Jan. 10, 1966.

By employing the N-methylolated acrylamide telomer of the present invention as the textile finishing agent in the Pad-Dry-Cure-System, it is possible to impart various excellent properties such as high crease resistance, preferable feeling with thick touch to the textile fabrics of natural or synthetic fibers or mixed spun fibers thereof.

N-methylolated acrylamide telomer of the present invention endows to textile goods of natural fiber and mixtures thereof with synthetic fiber prominent dry and wet crease resistance properties which have excellent stability against acid and alkali and excellent durability, and endows to textile goods of natural fibers, synthetic fiber and mixed spun thereof properties of permanent hardness and repulsion with fullness.

Fabric to be employed in the present invention includes fabrics comprising fibers of natural and synthetic and mixtures thereof. Examples of fabric of natural fiber include strings and textile fabrics of cotton, linen, silk and wool. Examples of textile fabric of synthetic fibers include strings and textile fabrics of regenerated fiber such as rayon, polyamide such as nylon, polyester such as polyethylene telephthalate, polyacrylic such as polyacrylonitrile, polypropylene and polyvinyl alcohol, among which polyester and polyamide are preferable.

Examples of mixed spun textile fabric include those of cotton and polyester, polyester and rayon, and rayon and polyamide.

It is possible to give numerous variations of effects in the processing of textile fabric, by controlling the molecular weight of the telomer, which is attained by changing the ratio of telogen to taxogen suitably in a process for producing acrylamide telomer. For example, in case of natural fiber and when priority is required on crease proof properties, N-methylolated compound of the average polymerization degree 5 or thereabout is suitable. Further, when emphasis is on the controlling filling of textile goods made of synthetic fiber or mixed spun fibers, those compounds having relatively large molecular weight are preferred. Furthermore, much more interesting processing effects can be obtained in case a mixture of two or more different molecular weight N-methylolated acrylamide telomers is used.

As the curing catalyst to be used in the present invention, inorganic and organic salts catalysts usually used for resin treatment, such as zinc nitrate, magnesium chloride, diammonium hydrogen phosphate, ammonium chloride, mineral acid salts of 2-amino-2-methylpropanol and ethanol amines, are suitable. Sufficient effects can be exhibited in the range of heat treatment temperature and time of the processing conditions being conventionally applied to the textile fabric processing. Said telomer is very stable and the stability thereof is still great even in a resin treatment bath to which a curing catalyst is added, and also has an advantage in allowing very easy and simple processing operation similar to the case of using initial condensation product of conventional thermosetting resin.

In carrying out the process of the present invention N-methylolated product of said telomer is dissolved in water and curing catalyst is added thereto to obtain a resin bath.

The preferable concentration of said telomer is 0.1 to 20 weight percent based on the weight of resin bath, and the preferable amount of the curing catalyst is 1 to 3 parts by weight per 10 parts by weight of the telomer.

The textile fabric to be treated is dipped into the resin bath, squeezed at a rate of 50 to 100% more preferably 60 to 80% and predried at a temperature of 80° to 105° C. for 2 to 5 minutes.

Thereafter the fabric is cured. The curing is conducted by heat-treatment at a temperature between 120° and 180° C. more preferably 130° and 160° C. for 3 to 10 minutes.

As described above, fabric processed with said telomer is very stable even in the presence of acid catalyst and in particular there is no injurious effect without soaping.

Further, in a process of processing, it is possible to add a precondensation product of other thermosetting resin, thermoplastic resin and other auxiliaries to the same resin treatment bath.

Examples of the thermosetting resin include N-methylolated glyoxal monoureine, alkyl carbamate, N-methylolated melamine, N-methylolated urea, N-methylolated ethyleneurea, N-methylolated uron, and N-methylolated triazone. Examples of the thermoplastic resin include poly(acrylic acid esters), poly(vinyl aceate), and poly(acrylamide).

The following examples are given only by way of illustration of the present invention, and it is not intended to limit the present invention to the examples.

EXAMPLE 1

To a 10% aqueous solution of N-methylolated acrylamide telomer, 1% by weight of zinc nitrate, $$Zn(NO_3)_2\text{—}6H_2O$$

is added as a condensation catalyst to obtain a resin bath. In the resin bath, 40's cotton broad cloth is dipped, squeezed to 80% and dried at 105° C., and then subjected to heat treatment with hot air at 150° C. for 3 minutes. After washing and drying, the processed cloth exhibits good wash and wear properties and excellent effects in durability, and acid and alkali hydrolysis resistance.

The comparisons of properties of the processed cloths treated by use of N-methylolated acrylamide telomer with those of processed cloths by use of melamine formaldedye having approximately the same number of methylol radicals and ethylene urea formaldehyde under the same conditions, will be tabulated in Table 1.

TABLE 1

|  | N-methylolated acrylamide telomer | | | Trimethylol melamine | Ethylene urea formaldehyde | Unprocessed cloth |
|---|---|---|---|---|---|---|
|  | A | B | C |  |  |  |
| Average polymerization degree | 5.2 | 12.9 | 12.9 |  |  |  |
| Methylolation degree, percent | 92 | 89 | 51 |  |  |  |
| Crease proof degree (W+F): |  |  |  |  |  |  |
| Dry | 240 | 251 | 249 | 227 | 244 | 160 |
| Wet | 239 | 257 | 258 | 195 | 215 | 145 |
| Tear resistance degree (W+F), g | 875 | 860 | 865 | 950 | 850 | 1,165 |
| Durability, after 10 turns of HL | 240 | 257 | 249 | 212 | 234 |  |
| Acid hydrolysis resistance property | 223 | 231 | 236 | 174 | 170 |  |
| Alkali hydrosis resistance property | 238 | 248 | 249 | 217 | 243 |  |
| Modulus of rigidity (W+F) mm | 94 | 230 | 228 | 188 | 82 | 85 |

The values above-mentioned are defined according to the specifications; crease proof degree, AATCC 66–1959T; tear resistance degree, ASTM D1424–56T; and modulus of rigidity, Federal Specification CCC–T–191b No. 5206. Further, acid and alkali hydrolysis resistance properties are obtained by measuring crease proof degree after drying the processed clothes which have been treated respectively in a HCl—KCl (pH=1.0) buffer solution and an NaOH solution (pH=13.0) at 40° C. for 30 minutes. HL means home laundering and one turn HL represents a washing which is conducted in an aqueous solution containing 0.25% of neutral detergent at 60° C. for 10 minutes at the bath ratio of 1:30.

As is clear from the above results, N-methylolated acrylamide telomer is of such characteristic to afford excellent wet crease resistance property as compared with, conventional processing agents, and is markedly excellent in durability and, acid and alkali hydrolysis resistance properties.

EXAMPLE 2

To a 5% aqueous solution of N-methylolated acrylamide telomer, prepared by using n-butanol, and having average polymerization degree, 12.9, molecular weight, 989, and methylolation degree, 100%, is added 0.5% of ammonium chloride as a condensation catalyst to obtain a resin bath. To the resin bath are immersed polyethylene terephthalate-cotton-broad cloth, polyamide taffeta, polyester taffeta, polypropylene taffeta and acryl tropical and they are squeezed to the rate of 60%, 55%, 55%, 50% and 63%, respectively, and dried at 80° C. Thereafter, they are subsequently subjected to heat-treatment with use of hot air at the respective temperatures as shown in Table 2 for 3 minutes, whereby good results in cure finishing effect are obtained.

TABLE 2

|  | Curing temperature (°C.) | Modulus of rigidity (W+F), mm. |
|---|---|---|
| Polyethylene terephthalate, cotton broadcloth | 150 | 121 |
| Polyamide taffeta | 150 | 139 |
| Polyester taffeta | 150 | 97 |
| Polypropylene taffeta | 120 | 100 |
| Acryl tropical | 130 | 153 |

Comparing with flat face appearance of processed textile fabric prepared by use of conventional filling controlling agents of polymer such as polyvinyl alcohol, polyvinyl acetate, polyacrylamide, etc.,N-methylolated acrylamide telomer is able to afford the properties of high repulsion, thickness and toughness.

We claim:

1. In a process for treating fabric comprising fibers of natural or synthetic fibers and mixtures thereof, the improvement which comprises dipping said fabric into a resin bath comprising an aqueous solution of an N-methylolated acrylamide telomer having the formula:

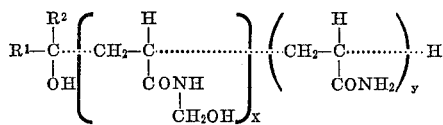

wherein $R^1$ and $R^2$ are hydrogen or alkyl having 1 to 12 carbon atoms, $x$ and $y$ are integers and $(x+y)$ is an integer of from 2 to 30, said aqueous solution containing a curing catalyst, squeezing said fabric, predrying the impregnated fabric and heating the dried fabric to cure the impregnated resin to endow the fabric with dry and wet crease resistance and permanent hardness and repulsion with fullness.

2. A process according to claim 1, wherein said resin bath consists essentially of said aqueous solution.

3. A process according to claim 1, wherein said resin bath further contains at least one resin selected from the group consisting of N-methylolated glyoxal monoureine, alkyl carbamate, N-methylolated melamine, N-methylolated urea, N-methylolated ethyleneurea, N-methylolated uron, N-methylolated triazone, poly(acrylic acid esters), poly(vinylacetate), and poly(acrylamide).

References Cited

UNITED STATES PATENTS

| | | | |
|---|---|---|---|
| 2,761,834 | 9/1956 | Suen et al. | 260—89.7 X |
| 2,899,263 | 8/1959 | Nuessle et al. | 117—139.4 X |
| 2,950,553 | 8/1960 | Hurwitz | 117—139.4 X |
| 3,214,420 | 10/1965 | Hunt et al. | 260—89.7 |
| 3,330,687 | 7/1967 | Nawakowski | 117—161 X |

WILLIAM D. MARTIN, Primary Examiner

T. G. DAVIS, Assistant Examiner

U.S. Cl. X.R.

117—141, 142, 143, 145, 161